US009569892B2

(12) United States Patent
Diaz Spindola et al.

(10) Patent No.: US 9,569,892 B2
(45) Date of Patent: Feb. 14, 2017

(54) IMAGE CAPTURE INPUT AND PROJECTION OUTPUT

(71) Applicant: QUALCOMM Incorporated, San Diego, CA (US)

(72) Inventors: Serafin Diaz Spindola, San Diego, CA (US); Virginia Walker Keating, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 179 days.

(21) Appl. No.: 14/038,480

(22) Filed: Sep. 26, 2013

(65) Prior Publication Data

US 2015/0085155 A1    Mar. 26, 2015

(51) Int. Cl.
| | |
|---|---|
| *H04N 9/31* | (2006.01) |
| *G03B 17/54* | (2006.01) |
| *G06T 19/00* | (2011.01) |
| *H04N 5/232* | (2006.01) |
| *H04N 5/74* | (2006.01) |
| *G06F 3/14* | (2006.01) |

(Continued)

(52) U.S. Cl.
CPC ............... *G06T 19/006* (2013.01); *G06F 3/14* (2013.01); *G06K 9/00671* (2013.01); *G06K 9/20* (2013.01); *G06K 9/2027* (2013.01); *G06K 9/78* (2013.01); *H04N 5/23229* (2013.01); *H04N 5/7408* (2013.01); *H04N 9/00* (2013.01); *H04N 9/3176* (2013.01); *G03B 17/54* (2013.01); *G06T 2215/16* (2013.01)

(58) Field of Classification Search
CPC .... H04N 5/408; H04N 5/2254; H04N 9/3176; G03B 17/12; G03B 17/54; G06T 2215/16
See application file for complete search history.

(56) References Cited

U.S. PATENT DOCUMENTS

| | | | |
|---|---|---|---|
| 8,400,548 B2 | 3/2013 | Bilbrey et al. | |
| 2012/0320157 A1* | 12/2012 | Junuzovic et al. | ............. 348/46 |

(Continued)

FOREIGN PATENT DOCUMENTS

| | | |
|---|---|---|
| JP | 2002081909 A | 3/2002 |
| WO | 2013019252 A1 | 2/2013 |
| WO | 2013023705 A1 | 2/2013 |

OTHER PUBLICATIONS

International Search Report and Written Opinion—PCT/US2014/057117—ISA/EPO—Feb. 5, 2015.

(Continued)

*Primary Examiner* — Twyler Haskins
*Assistant Examiner* — Fayez Bhuiyan
(74) *Attorney, Agent, or Firm* — Kilpatrick Townsend & Stockton LLP

(57) ABSTRACT

Systems and methods are provided for alternating projection of content and capturing an image. The method includes steps of projecting, by a projection device, content at a first rate, projecting, by the projection device, a capture frame at a second rate, and capturing, by an image capture device, an image including the capture frame at the second rate, wherein capturing the image comprises capturing the image when the capture frame is projected. Systems and methods provided herein may provide increased tracking accuracy by a projecting a capture frame that does not obscure features in the image.

30 Claims, 9 Drawing Sheets

(51) Int. Cl.
  *G06K 9/00*  (2006.01)
  *G06K 9/20*  (2006.01)
  *G06K 9/78*  (2006.01)
  *H04N 9/00*  (2006.01)

(56) References Cited

U.S. PATENT DOCUMENTS

| | | | |
|---|---|---|---|
| 2013/0002649 A1 | 1/2013 | Wu et al. | |
| 2013/0076789 A1 | 3/2013 | Majumder et al. | |
| 2014/0071164 A1* | 3/2014 | Saklatvala | G06F 3/005 345/633 |

OTHER PUBLICATIONS

Von Hardenberg, Christian et al., "Bare-Hand Human-Computer Interaction," Proceedings of the ACM Workshop on Perceptive User Interfaces, Nov. 2001, 8 pages.
Cotting, Daniel et al., "Embedding Imperceptible Patterns into Projected Images for Simultaneous Acquisition and Display", Proceedings of the Third IEEE and ACM International Symposium on Mixed and Agumented Reality (SMAR 2004), Nov. 2, 2004, 10 pages.
3M: "3M Mobile Productivity," 3M™ Mobile Projector MP220, Retrieved date on Oct. 23, 2013, Retrieved from the Internet: URL: http://solutions.3m.com/wps/portal/3M/en_US/MobileProductivity/Home, pp. 3.
AAXA Technologies: "Home & Portable Products," Retrieved date on Oct. 22, 2013, Retrieved from the Internet: URL: http://www.aaxatech.com/products/consumer.htm, pp. 2.
ACER: "Acer Explore Beyond Limits—C120 EY.JE001.010," Retrieved date on Oct. 22, 2013, Retrieved from the Internet: URL: http://us.acer.com/ac/en/US/content/home/model/EY.JE001.010, pp. 2.
AIPTEK: "DLP Pico Projector for iPhone 5 & 5S," Mobile Cinema i55, Retrieved date on Oct. 22, 2013, Retrieved from the Internet: URL: http://www.aiptek.de/index.php/en/products/pico-projectors, pp. 2.
AIPTEK: "Products-Projector," Retrieved date on Oct. 22, 2013, Retrieved from the Internet: URL: http://www.aiptek.com.tw/c1.php?bid=18, p. 1.
Baldauf M., et al., "Supporting Hand Gesture Manipulation of Projected Content with Mobile Phones," 2009, pp. 4.
Ballendat, et al., "Proxemic Interaction: Designing for a Proximity and Orientation—Aware Environment," Department of Computer Science, University of Calgary, Canada, ITS'10, Nov. 7-10, 2010, pp. 1-10.
DOCOMO: "Mobility-Separable Phone Sets Itself Apart," Apr. 27, 2010, pp. 1-4.
Harrison C., et al., "Skinput: Appropriating the Body as an Input Surface," CHI 2010: Computing on the Body, Apr. 10-15, 2010, pp. 453-462.
"Ray Products," Retrieved date on Oct. 22, 2013, Retrieved from the Internet: URL: http://www.raydisplays.com/meetray.html, pp. 2.
Lochtefeld M., "Advanced Interaction with Mobile Projection Interfaces," UIST 11 Adjunct Proceedings of the 24th annual ACM symposium adjunct on User interface software and technology, Oct. 16-19, 2011, pp. 43-46.
Optoma: "Pico PK320," Retreived date on Oct. 22, 2013, Retrieved from the Internet: URL: http://www.optomausa.com/products/detail/Pico-PK320, pp. 4.
Philips: "Pico Pix Pocket projectors," Retrieved date on Oct. 22, 2013, Retrieved from the Internet: URL: http://www.philips.co.uk/c/pocket-projector/179840/cat, pp. 3.
Samsung Galaxy Beam: "Light up and share, anytime, anywhere," Retrieved date on Oct. 22, 2013, Retrieved from the Internet: URL: http://www.samsung.com/global/microsite/galaxybeam/feature.html, pp. 5.
Samsung: "Samsung PICO Projector," Retrieved date on Oct. 22, 2013, Retrieved from the Internet: URL: http://www.samsung.com/hk_en/consumer/computer-peripherals/projector, pp. 2.
Savov V., "LG eXpo projector hands-on," 2010, Retrieved date on Oct. 22, 2013, Retrieved from the Internet: URL: http://www.engadget.com/2010/01/07/lg-expo-projector-hands-on, pp. 3.
Tamaki E., et al., "Brainy Hand: A Wearable Computing Device without HMD and It's Interaction Techniques," AVI '10 Proceedings of the International Conference on Advanced Visual Interfaces, May 25-29, 2010, pp. 387-388.
Tamaki E., et al., "Brainy hand: An Ear-worn Hand Gesture Interaction Device," CHI EA '09 CHI '09 Extended Abstracts on Human Factors in Computing Systems, Apr. 4-9, 2009, pp. 4255-4260.

* cited by examiner

IMAGE CAPTURE INPUT AND PROJECTION OUTPUT

TECHNICAL FIELD

Embodiments disclosed herein are generally directed to systems capable of capturing an image and projecting content.

BACKGROUND

Augmented Reality (AR) is an emerging technology that allows a user to change the way that they interact with the world. AR is a live, direct or indirect view of a physical, real-world environment wherein the elements are augmented by computer generated input such as sound, video, graphics, and/or Global Positioning System (GPS) data, for example. In some uses, AR is enabled by a device that has an image capture device that captures images of the environment around a user and then uses object recognition algorithms for recognizing objects in the captured images for augmentation. The user may then be provided with a view of the environment around the user on a display of the device with portions of the view augmented based on the recognized objects, for example.

The development of personal, mobile, or pico projectors has provided additional functionality to AR. For example, instead of or in addition to displaying a view of the augmented environment on a screen, a device may interact with the projector to recognize an object and project content onto the actual object and/or onto an area near or around or associated with the object, for example.

SUMMARY

Consistent with some embodiments, there is provided a method including projecting, by a projection device, content at a first rate, projecting, by the projection device, a capture frame at a second rate, capturing, by an image capture device, an image when the capture frame is projected, and performing a computer vision function based at least in part on the captured image. The method may also be embodied in a non-transitory computer-readable medium. The method may also be used to create an augmented reality.

Consistent with some embodiments, there is also provided a system. The system includes a projection device configured to project content at a first rate and a capture frame at a second rate. The system also includes an image capture device configured to capture an image when the projection device projects the capture frame. The system further includes one or more processors coupled to the projection device and the image capture device, the one or more processors configured to process the captured image and generate the content or determine a location or orientation of the content for projection based at least in part on the captured image. The system further includes a memory coupled to the one or more processors.

Consistent with some embodiments, there is further provided a system. The system includes means for projecting content at a first rate, means for projecting a capture frame at a second rate, means for capturing an image when the capture frame is projected, and means for performing a computer vision function based at least in part on the captured image.

Consistent with some embodiments, there is also provided a method including capturing an image including projected content, capturing an image including a projected capture frame, and performing a computer vision function based at least in part on the image including a projected capture frame. The capture frame may be projected at a first rate. The image including the projected capture frame may be captured based on the first rate. In some embodiments, the content and the capture frame may projected by a projection device. Moreover, the image including the projected capture frame may be captured in response to receiving a signal from the projection device or from a processing device coupled to the projection device, and/or the signal may be wirelessly received from a remote device. In some embodiments, the method includes analyzing a captured image to determine whether the captured image comprises the image including the projected capture frame, and the determination may be based on a time stamp of the captured image or on identifying a fiducial or marker in the captured image. In some embodiments, the image including projected content may include the image including the projected capture frame. In some embodiments, the content may be projected onto an object, wherein the computer vision function comprises recognizing or tracking the object Consistent with some embodiments, there is further provided a method including capturing at least one image of a field of view including an area onto which content is being projected and onto which capture frames are being projected at a first rate, determining one or more images of the at least one image which includes at least a portion of a projected capture frame, and performing a computer vision function based at least in part on the one or more images. In some embodiments, the content and the capture frame may be projected by a projection device. Moreover, the determining may be based on a received signal and, in some embodiments, the signal is received from the projection device or from a processing device coupled to the projection device, or the signal may be wirelessly received from a remote device. In some embodiments, the capturing may be performed in response to the determining based on the received signal. In some embodiments, the determining may be based on the first rate and the capturing may be performed in response to the determining based on the first rate. In some embodiments, the determining may be based on a time stamp of the one or more images. Moreover, the determining may be based on identifying a fiducial or marker in the one or more images. In some embodiments, the capture frame may include content and one or more capture areas. Furthermore, the content may be projected onto an object, and the computer vision function includes recognizing or tracking the object.

Figure 1:
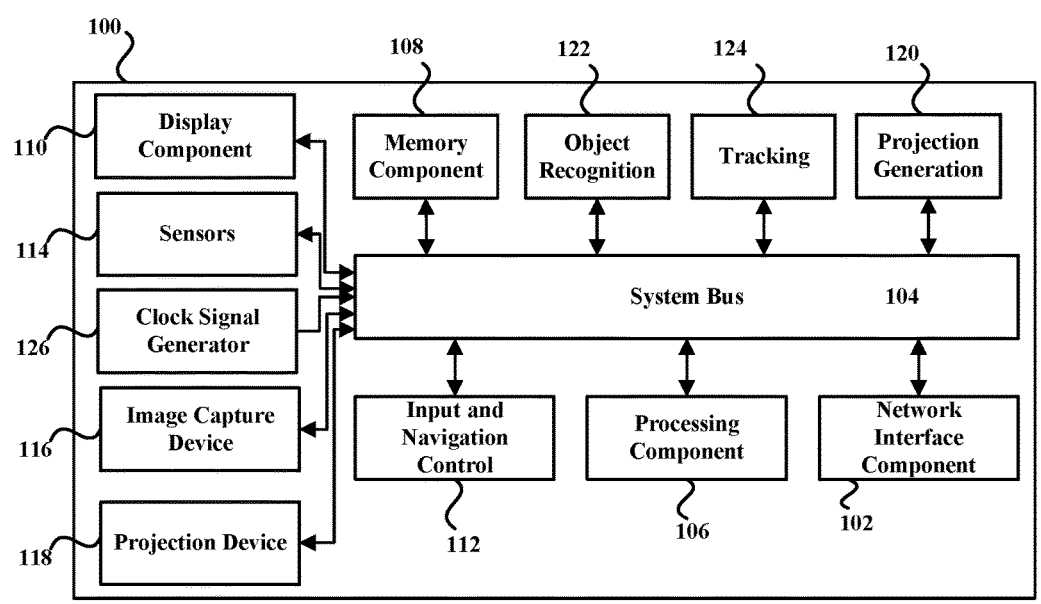
FIG. 1 is a diagram illustrating a processing device, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Portable or pico projectors, as described previously, may be used in AR systems and video games to project content including images or other information into an area, wherein the projected content may be based on a captured image. However, projected content may introduce additional lines, colors, and text onto objects in the field of view of the image capture device that may make it difficult for object recognition and/or tracking algorithms to continue to recognize and/or track the objects in the field of view. Moreover, the projector may utilize object recognition and tracking algorithms to "track" the object to keep the projected content in place as the projector and/or objects in the filed of view move, which can be hindered by the projection.

Accordingly, systems and methods for image capture input and projection output that allow an image capture device to capture images for performing computer vision functions including object recognition and tracking, event detection, motion estimation, object identification, object detection, object classification, and optical character recognition. The systems and methods may capture images during one or more periods when the projector is not projecting content that can obscure the captured image. In particular, embodiments disclosed herein may capture an image when content is not being projected and when a capture frame is being projected.

FIG. 1 is a diagram illustrating a processing device 100, consistent with some embodiments. Processing device 100 may be a mobile device such as a smartphone, a tablet computer, a personal computer, a laptop or netbooks, a set-top box (STB) such as provided by cable or satellite content providers, or a video game system console. Processing device 100 may also be a head-mounted display (HMD) or other wearable computing device. In some embodiments, processing device 100 is implemented in an automobile, for example in an entertainment center or console of an automobile, or is included or implemented in a healthcare device. According to some embodiments, processing device 100 may be implemented using any appropriate combination of hardware and/or software configured for capturing images and projecting content. In particular, processing device 100 may include any appropriate combination of hardware and/or software having one or more processors and capable of reading instructions stored on a non-transitory machine-readable medium for execution by the one or more processors for capturing images and projecting content. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which one or more processors or computer is adapted to read.

Processing device 100 may include network interface component 102 configured for communication with a network. Consistent with some embodiments, network interface component 102 may be configured to interface with a coaxial cable, a fiber optic cable, a digital subscriber line (DSL) modem, a public switched telephone network (PSTN) modem, an Ethernet device, and/or various other types of wired network communication devices. Network interface component 102 may also include one or more wireless transceivers, wherein each wireless transceiver may include an antenna that is separable or integral and is capable of transmitting and receiving information according to a different wireless networking technologies, such as Wi-Fi™, 3G, 4G, HSDPA, LTE, RF, NFC.

Consistent with some embodiments, processing device 100 includes a system bus 104 for interconnecting various components within processing device 100 and communicating information between the various components. In some embodiments, the bus 104 is implemented in a System on Chip (SoC) and connects various elements or components on the chip and/or cores of one or more processors. Components may include a processing component 106, which may be one or more processors, central processing units (CPUs), image signal processors (ISPs), micro-controllers, or digital signal processors (DSPs), graphics processing units (GPUs), and audio signal processors, which may include analog and/or digital audio signal processors. Components may also include a memory component 108, which may correspond to random access memory (RAM), read only memory (ROM), optical, magnetic, solid-state, or other memories such as described above.

Consistent with some embodiments, processing device 100 may also include a display component 110 for displaying information to a user. Display component 110 may be a liquid crystal display (LCD) screen, an organic light emitting diode (OLED) screen (including active matrix AMOLED screens), an LED screen, a plasma display, or a cathode ray tube (CRT) display. Display component 110 may be integrated with processing device 100, or may be separate from processing device 100 and coupled to processing device 100. Processing device 100 may also include an input and navigation control component 112, allowing for a user to input information and navigate along display component 110. An input and navigation component 112 may include, for example, a keyboard or key pad, whether physical or virtual, a mouse, a trackball, or other such device, or a capacitive sensor-based touch screen.

Processing device 100 may also include sensors 114 that capture data associated with device 100 and/or its surroundings. Sensors 114 may include, but are not limited to, microphones or audio sensors, cameras, light sensors, proximity sensors, depth sensors, pressure sensors, inertial sensors (e.g., accelerometers and/or gyroscopes), magnetometers, etc. Sensors 114 may be used individually or in combinations, such as sensor arrays or any other combinations. Sensors 114 are capable of operating interdependently or independently of one another. Sensors 114 may communicate with processing component 106 through system bus 104 in order to process data captured by sensors 114 consistent with instructions stored in, for example, memory component 108 and other modules, and to generate or otherwise obtain metadata associated with captured data.

Processing device 100 may also include an image capture device 116. In some embodiments, image capture device 116 may be a camera, such as a visible light camera or a depth-sensing camera, such as the Microsoft® Xbox™ Kinect™ camera. Image capture device 116 may also be configured to detect infrared (IR) light or ultraviolet (UV) light. Image capture device 116 may also be a stereo camera, a time-of-flight (ToF) camera, or other camera capable of detecting a capturing an image. In some embodiments, image capture device 116 may be configured to capture one or more images of objects within the field of view of image capture device 116 for processing. In some embodiments, the image capture device 116 is included in the sensors 114.

Processing device 100 may also include a projection device 118. Projection device 118 may be a device capable of projecting light to form one or more images. The one or more images may include content such as static or moving images that are projected as a collection of frames. In some embodiments, projection device 118 may alter the placement of the projected light to give a projected image the appearance of movement or animation. Projection device 118 may be a Digital Light Processing (DLP) projector, a laser beam-steering (LBS) projector, a liquid crystal on silicon (LCOS) projector, or other projector. In some embodiments, projection device 118 may also be a mobile or portable projector.

Processing device 100 may also be capable of projection generation 120, and computer vision functions such as object recognition 122 and tracking 124. These functions may be performed by one or more software modules that perform a function when executed by processing component 106. In other embodiments, the functions may refer to an Application Specific Integrated Circuit (ASIC) or other circuit having memory and at least one processor for executing instructions to perform the function. Thus, the functions 120-124 may be separate from other components in the device 100, as illustrated in FIG. 1, or may be combined and/or implemented in one or more other modules illustrated in FIG. 1, for example in the processing component 106. In some embodiments, projection generation 120 may include generating content including one or more images for projection by projection device 118 onto a target object or an area for viewing, interacting, and/or other consumption by one or more users of device 100 and/or others who may not be using device 100 but may be within a viewable distance of the target object or area. In some embodiments, the content may be content for augmenting a target object or area.

In some embodiments, projection generation 120 may also include generating a capture frame for projection by projection device 118. The capture frame may be a frame that is projected at a frame rate that is lower than the frame rate of the projected content and may be alternatingly projected with the projected content or projected along with the projected content. The capture frame may be projected to allow image capture device 116 to capture an image without projected content, so that the projected content does not obscure features within the captured image for processing. In some embodiments, the projected capture frame is projected at a frame rate that is sufficient for object recognition 122 or tracking 124 while remaining unnoticed by an observer. In some embodiments, content may be projected by projecting device at a frame rate of about 23.976-300 frames per second (fps), while a capture frame is projected at a rate of about 10-20 fps. In some embodiments, content may be projected at a frame rate of about 72 fps and the capture frame may be projected at a rate of about 15 fps. In some embodiments, the projection rates of content and the capture frame may be higher or lower depending on capabilities of image capture device 116, projection device 118, and/or the needs of a particular application or experience. In some embodiments, image capture device 116 may be configured to capture images at a predetermined rate that is independent of the projection of a capture frame, wherein object recognition 122 and tracking 124 is performed on those captured images that include capture frames. In other embodiments, image capture device 116 may be configured to capture images at a rate that is related to the projection of the capture frame. For example, image capture device 116 may be configured to capture images at a rate that is at least two times the projection rate of a capture frame such that at least one image is captured when the capture frame is projected and at least one image is captured when the capture frame is not projected.

In some embodiments, the capture frame may be a blank frame where no content is projected. In other embodiments, the capture frame may be a frame of a solid neutral color that does not have a pattern, or has a very subtle and minimal pattern that is projected to allow image capture device to capture an image that does not obscure lines, features, or boundaries of objects within the field of view of image capture device 116 that may be processed for tracking 124, object recognition 122, and/or other computer vision functions. In some embodiments, the solid neutral frame of the solid neutral color may have a very light color, such as white, a color with very low saturation, such as gray, or a very dark color, such as black. Moreover, the capture frame may include or be composed of a frame of high light intensity that may be used to illuminate the field of view to facilitate image capture by image capture device 116 in low-light situations. In some embodiments, the intensity is determined by an ambient light sensor and/or information from the image capture device 116. In some embodiments, the capture frame may include a marker, fiducial, or other indicator that, when captured by image capture device 116 and processed, provides an indication that the captured frame with the marker or fiducial is the frame to be used for performing computer vision functions, such as object recognition 124 and tracking 122. Further, in some embodiments, the capture frame may be projected along with content and may be a portion or subset of the projected content which includes no content or no images.

In some embodiments, projection device 118 and image capture device 116 may be synchronized so that image capture device 116 captures an image of an area in the field of view when projection device 118 is projecting a capture frame. In some embodiments, projection device 118 may be capable of sending a signal to image capture device 116 to indicate that a capture frame is being projected. The signal may be transmitted via software, or may be sent over a hardware line. The signal may also be sent wirelessly from a remote device, for example when distributed components are implemented, some embodiments of which are described below. Alternatively, the signal may be provided along with the generation of the capture frame in projection generation 120. Moreover, projection device 118 and image capture device 116 may be synchronized using clocking provided by clock signal generator 126 so that projection device 118 and image capture device 116 may be capable of simultaneously projecting a capture frame and capturing an image. In some embodiments, the synchronized clocks of projection device 118 and image capture device 116 may allow projection device 118 and image capture device 116 to have aligned duty cycles, for example allowing in some embodiments for image capture device 116 to capture images based on a projection rate of a capture frame, content, or a combination thereof.

Object recognition 122 may include performing one or more object recognition algorithms on images captured by image capture device 116. The object recognition algorithms performed in object recognition 122 may be capable of recognizing an object in one or more image frames using feature detection, pattern recognition, appearance matching, image matching, edge and/or line detection, and the like. In some embodiments, objects recognized in object recognition 122 may be objects used for tracking 124, objects designated as targets of a projection, and/or objects for augmentation. In some embodiments, object recognition 122 may include automatically recognizing and designating recognized objects as targets for projection and/or augmentation.

In some embodiments, a user of processing device 100 may be capable of designating an object within a field of view as a target for projection or an object for augmentation by selecting or otherwise interacting with the object. In some embodiments, the object may itself be manipulated by the user, while in other embodiments the user may interact with the object as it is displayed on processing device 100 by, for example, display component 110. If a user selects an object for augmentation, object recognition 122 may include attempting to recognize the selected object and augment the recognized object with content based on information provided by a third party or by information related to the object. In some embodiments, object recognition 122 may include communicating with a network using network interface component 102 to perform object recognition 122 and to find content related to the object. In some embodiments, recognition of certain objects is sufficient to determine an augmentation without action or input by the user.

Tracking 124 may include associating a location of objects within a target area over time. In some embodiments, tracking 124 may be configured to control a projection based on the determined location and orientation of objects in a target area over a period of time so that the projected content remains projected on one or more designated target objects even as the projector moves or the target objects move. Tracking 124 may control a projection of projection device 118 based on images captured by image capture device 116 and, in some embodiments, information from sensors 114. In some embodiments, tracking 124 may include estimating pose, orientation, and depth information about target objects using images captured by image capture device 116 and/or information obtained by sensors 114, such as an accelerometer or gyroscope. Tracking 124 may further include generating one or more matrices that may later be used in projection generation 120 for controlling a projection by projection device 118, including generating augmented reality content. Tracking 124 may include scaling, rotating and/or translating content for projection generation 120 based on captured images from image capture device 116 and/or information from sensors 114. Tracking 124 may include determining six degrees-of-freedom based on the captured image and tracking content for projection based on the determined six degrees-of-freedom. For embodiments where image capture device 116 is or includes a depth sensing camera, the one or more images may be processed to develop a depth map of the field of view. The depth map may be used in tracking 124 for tracking and controlling the projection, including maintaining a proper focus of the projection.

Processing device 100 may also include a clock signal generator 126. Clock signal generator 126 may be configured to generate a clock signal used by components of processing device 100. In some embodiments, image capture device 116 may be configured to capture an image when projection device 118 is projecting a capture frame based on a predetermined timing corresponding to a projection rate of the image capture frame, which may be projected at a rate of 10-20 fps, as discussed above. For example, image capture device 116 may be configured to capture an image of the field of view that includes the projected capture frame every 67 ms based on a projection rate of an image capture frame of 15 fps, the timing being provided to image capture device 116 by a clock signal generated by clock signal generator 126. Similarly, projection device 118 may be configured to project a capture frame every 67 ms consistent with an image capture frame projection rate of 15 fps based on a timing provided by the generated clock signal. Alternatively, image capture device 116 may be configured to capture an image at a rate that is at least two times the projection rate of the capture frame such that at least one image is captured when the capture frame is being projected and at least one image is captured when the capture frame is not projected.

In embodiments wherein image capture device 116 is configured to capture images at a rate independent of the projection rate of the capture frame, images not including a capture frame, which may include capture frames having a fiducial or marker, may be discarded or given a low weight during processing based on the known rate of projection of the capture frame or by clock signals associated with the captured frames. Projecting a fiducial or marker may reduce the coordination implemented between the projection device 118 and image capture device 116 in some embodiments. Moreover, clock signal generator 126 may be used by processing device 100 to timestamp captured images, with the timestamps of capture frames being known and used to know which captured images to analyze and/or perform object recognition 122, tracking 124, and other computer vision functions on.

Processing device 100 may include more or less components than shown in FIG. 1 according to some embodiments. Moreover, components shown in FIG. 1 may be directly coupled to one or more other components in FIG. 1, eliminating a need for system bus 104. Furthermore, components shown in FIG. 1 may be shown as being part of a unitary device 100, but may also be part of a system where the components are separate but coupled and in communication. In general, the components shown in FIG. 1 are shown as examples of components in a processing device 100 capable of performing embodiments disclosed herein. However, a processing device 100 may have more or fewer components and still be capable of performing some embodiments disclosed herein.

Figure 2A:
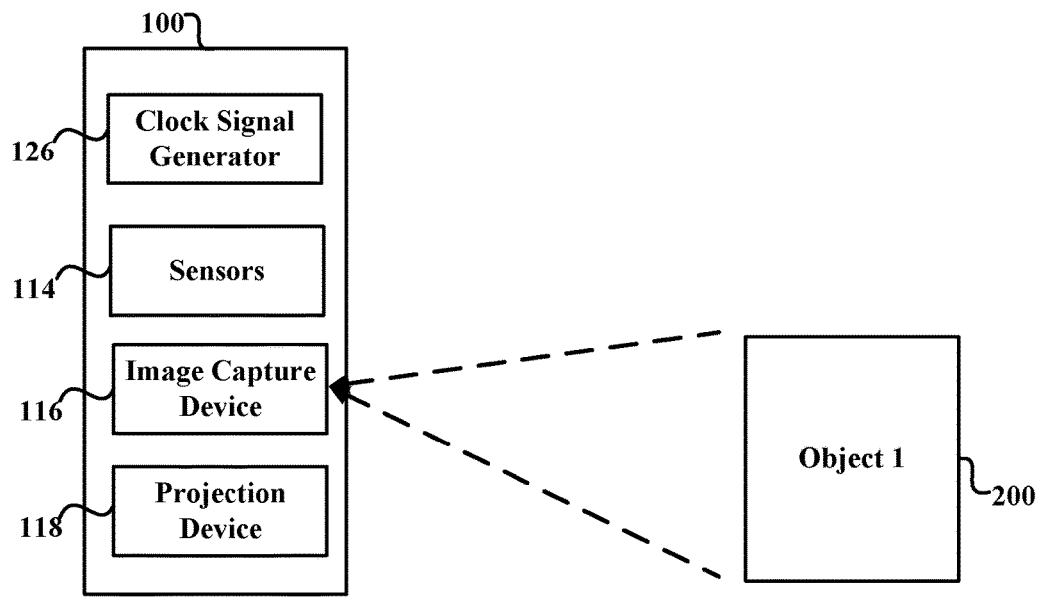
FIGS. 2A-2E illustrate an example of capturing images for input and projecting content, consistent with some embodiments.

FIGS. 2A-2E illustrate an example of capturing images for input and projecting content, consistent with some embodiments. For the purpose of illustration, only a portion of processing device 100 is shown in FIGS. 2A-2E; however reference may be made to other components of processing device 100 shown in FIG. 1. As shown in FIG. 2A, image capture device 116 may be capable of capturing an initial image of a field of view that includes object 1 200. In some embodiments, a computer vision function such as object recognition 122 may be performed on the captured image to attempt to recognize object 1 200. In some embodiments, a pose may be determined from an initial image of a field view that includes object 1 200. In some embodiments, the captured image may be a subsequent captured image after capturing an initial image and tracking 124 may also be performed on the captured image to, for example, determine a pose, position, six degrees-of-freedom (DOF), and/or other information about object 1 200. In some embodiments, image capture device 116 may include a depth camera which may be used to determine a depth map of the field of view including object 1 200, which may be used for tracking 124 of object 1 200 and for focusing a projection on object 1 200.

Figure 2B:
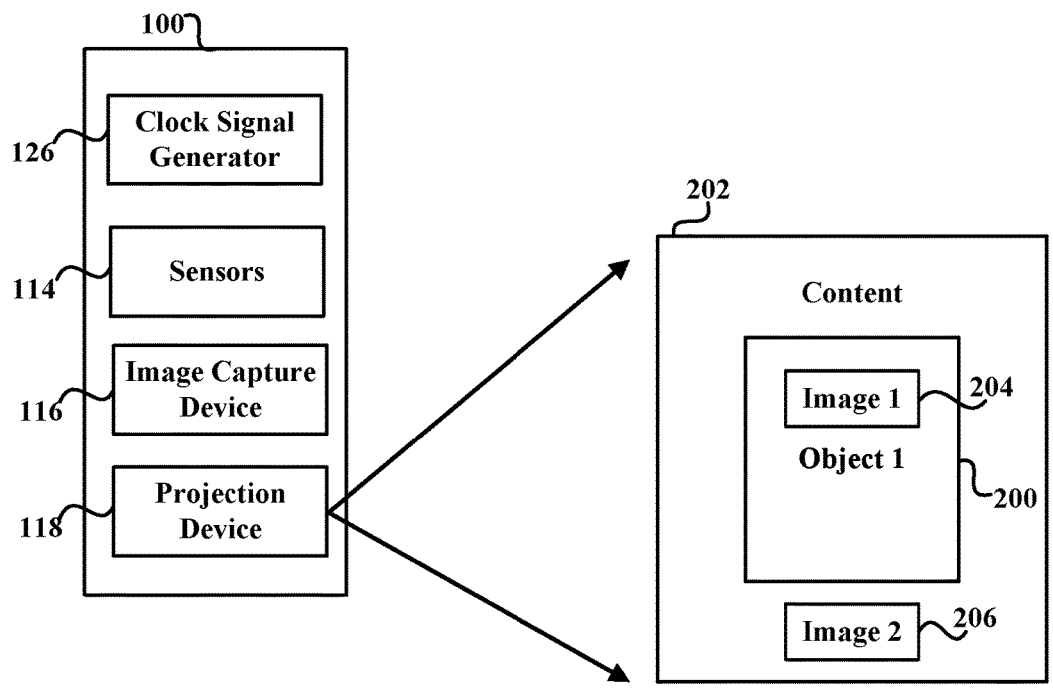

As shown in FIG. 2B, projection device 118 may project content 202 into the field of view, including on and around object 1 200. In some embodiments, the projection of content 202 onto and around object 1 may be controlled based on tracking 124 subsequent captured images, as described above. In some embodiments, the alignment and/or position of projected content may be adjusted based on tracking object 1. Moreover, content 202 may also be controlled based on information obtained from sensors 114, which may include an orientation of device 100 and/or projection device 118, whether device 100 and/or projection device 118 is stable, and a brightness level of the field of view. In some embodiments, content 202 may be generated, in part or in whole in some embodiments, based on object recognition 122. Object recognition 122 may include identifying features of object 1 200, and searching to find a matching object and content 202 associated with the matching object. The searching may be performed based on features representative of objects in memory component 108, or over a network. A matching object may have associated content 202 that may be projected on and around object 1 200. The associated content 202 may include information related to object 1 200 such as features of object 1 200 or instructions for using object 1 200. In some embodiments, content 202 associated with a matching object may be used to augment object 1 200 and an area around object 1 200 to create an augmented reality around object 1 200.

In some embodiments, content 202 may also include user selected features. For example, an image of object 1 200 captured by image capture device 116 may be displayed on display component 110 of device 100 and a user of device 100 may be capable of interacting with the displayed image using input and navigation control component 112 to select or create features that may be included in content 202. These features may be included along with content from object recognition 122 in projection generation 120 of content 202. Content 202, which may refer to elements within a projection or to the entire projection projected from projection device in some embodiments, may also include one or more specific images, such as image 1 204 and image 2 206. As shown in FIG. 2B, content 202 may include image 1 204 projected on object 1 200 image 2 206 projected below object 1 200. In some embodiments, the projection of content 202 including image 1 204 and image 2 206 on object 1 200 may augment object 1 200 to create an augmented reality around object 1 200.

Figure 2C:
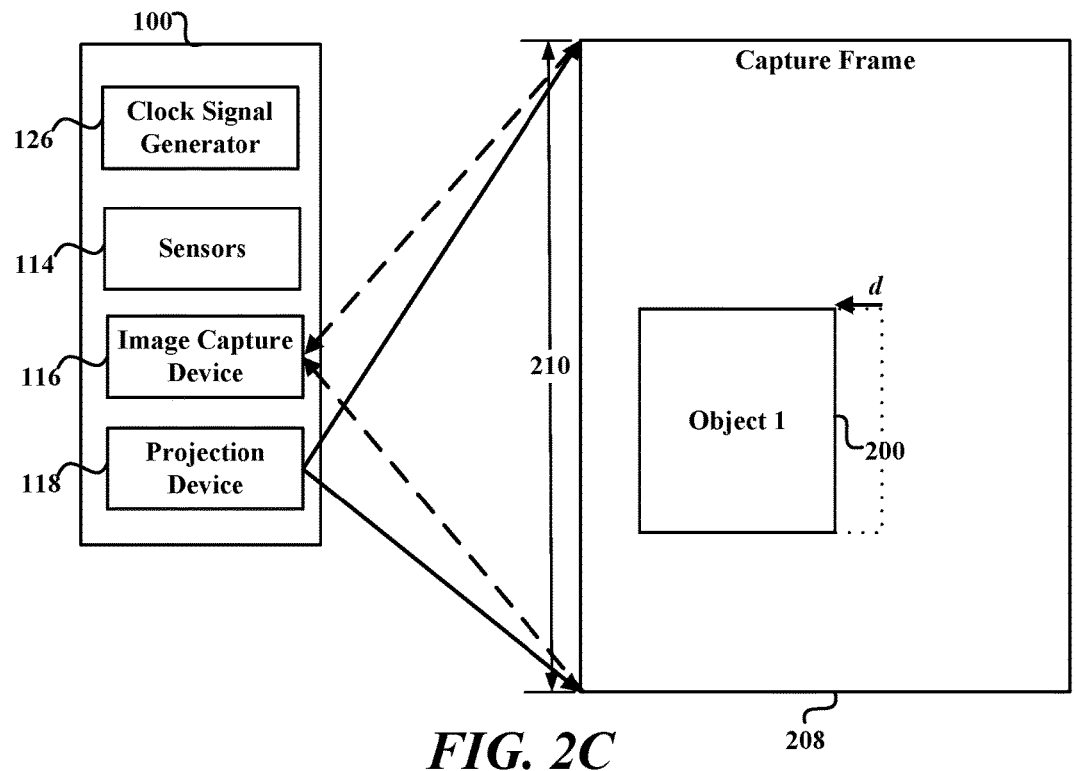

As shown in FIG. 2C, object 1 200 is located a distance d away from its previous position. In order to capture this change in position for tracking 124 and to determine additional information about the field of view, projection generation 120 may include periodically generating a capture frame 208 for projection by projection device 118. In some embodiments, capture frame 208 may be a blank frame where no content is projected. Capture frame 208 may also be a frame of a solid neutral color that does not obscure lines, features, or boundaries of object 1 200. As capture frame 208 is projected by projection device 118, image capture device 116 may be capable of capturing an image of a field of view 210 including capture frame 208. Although capture frame 208 is shown as being projected to cover field of view 210 of image capture device 116, the dimensions of capture frame 208 may be larger or smaller, and may be set by a user, manufacturer, or developer and could vary in size in relation to the projected content 202 and/or object 1 200.

In some embodiments, projection device 118 may be capable of sending a signal to image capture device 116 over bus 104 when capture frame 208 is being projected. In some embodiments, image capture device 116 and projection device 118 may be synchronized based on a clock signal generated by clock signal generator 126 so that capture frame 208 is projected and an image of field of view 210 are simultaneously captured at a predetermined timing. In some embodiments, this predetermined timing may be sufficient to enable tracking 124 while capture frame 208 remains unnoticed by a human eye. In some embodiments, image capture device 116 and projection device 118 may be synchronized based on a clock signal generated by clock signal generator 126 such that image capture device 116 captures at least one image of field of view 210 that includes capture frame 208 and at least one image of field of view 210 that does not include capture frame 208.

Figure 2D:
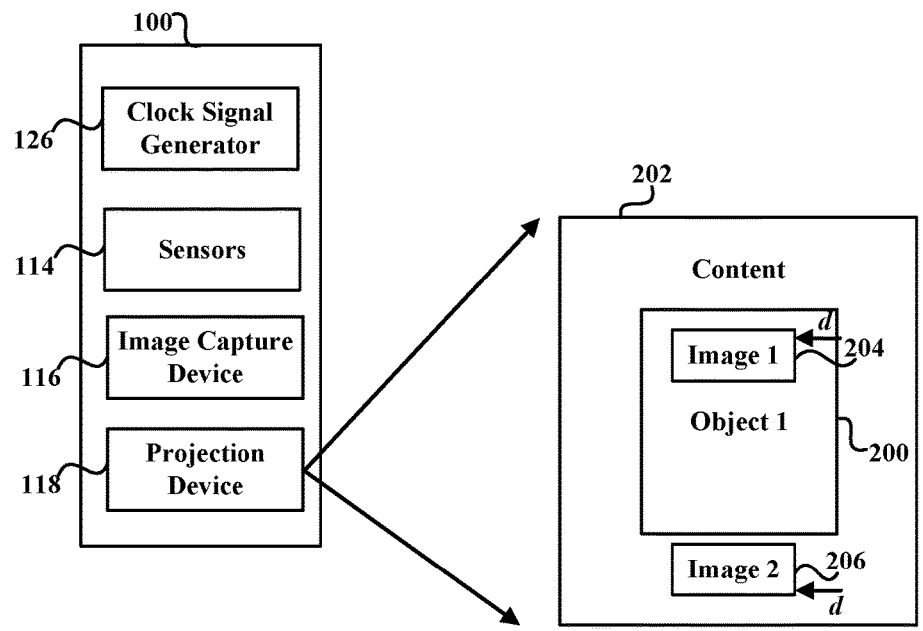

As shown in FIG. 2D, after capture frame 208 is projected, content 202 including image 1 204 and image 2 206 may again be projected by projection device 118 on and/or around object 1 200. Based on tracking 124 and other processing performed on the captured image of field of view 210 when capture frame 208 was projected, the position and orientation of content 202 including image 1 204 and image 2 206 may be corrected based on the displacement d of object 1 200 with respect to its previous position.

In some embodiments, content including image 1 204 and image 2 206 may have changed and may have dimensions that are larger or smaller than image 1 204 and image 2 206. In order to maintain the position and orientation of content 202 including any changed images, the content 202 or any elements thereof may be scaled, positioned, and/or otherwise manipulated such that the position and/or orientation of content projected onto and around object 1 200 remains constant.

Figure 2E:
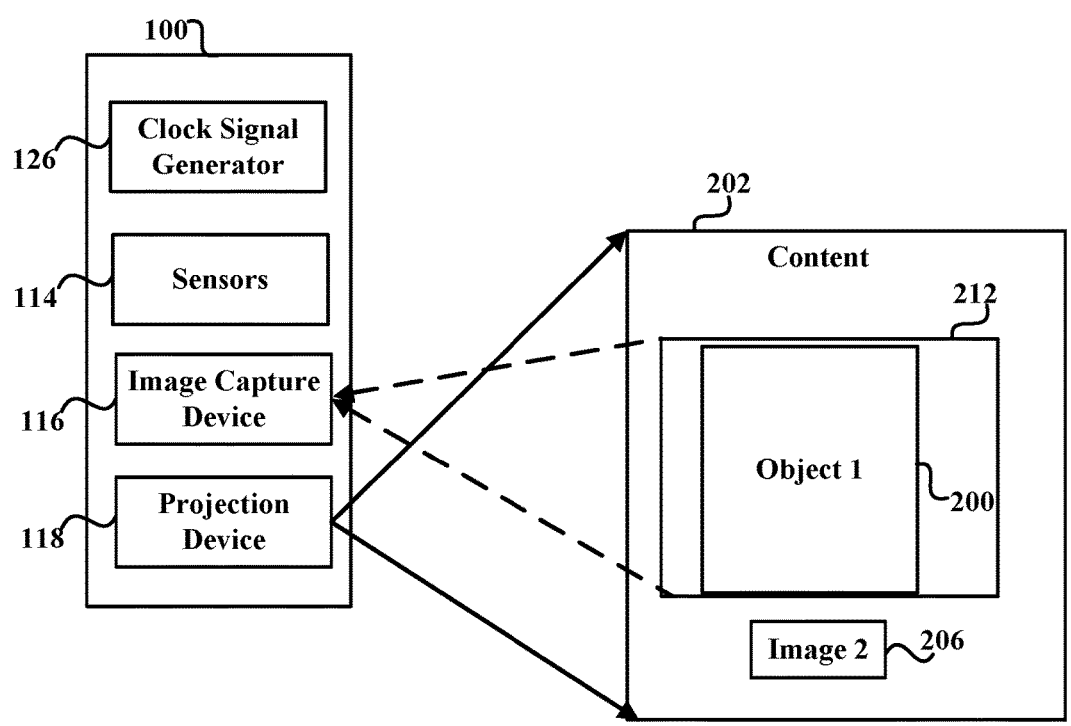

In some embodiments, processing device 100 may be able to trim a portion of content and/or create a mask that allows content 202 to be projected around an object while a capture area 212 is projected on an expected position of an object determined through, for example, tracking 124. As shown in FIG. 2E, for example, projection device 118 projects a capture frame having content 202 including image 2 206 around object 1 200 while projecting capture area 212 around an expected position of object 1 200. Capture area 212 may be an area where no content is projected, and may be blank or a neutral color. In some embodiments, image capture device 116 may be configured to capture an image of an area including capture area 212. In some embodiments, capture area 212 may include a fiducial or marker and image capture device 116 captures an image of an area including content 202 and capture area but object recognition 122 and/or tracking 124 may only be performed on a captured area defined with respect to the fiducial or marker, or the fiducial or marker may indicate that the projection includes the capture area 212. In some such embodiments, the fiducial or marker may be hidden within the content 202 such that the user is not aware of the fiducial or maker and/or to decrease the likelihood of the image or marker obscuring object 1 200. In some embodiments, the processing device 100 interleaves capture frames having content and capture frames which do not include content. Those of skill in the art will appreciate that while one capture area is illustrated in FIG. 2E, additional capture areas may be included in the capture frame, for example when tracking a plurality of objects (e.g., as shown in some embodiments pursuant to FIGS. 3-4).

In one example, object 1 200 may be a printer or other device and content 202 may be instructions for operating the printer or other device. Image 1 204 and image 2 206 may be positioned on specific buttons, displays, or other parts of the printer or other device and may include instructions relevant to the specific area. For example, if object 1 200 is a printer that includes a display that is displaying an error message, object recognition 122 of a captured image may recognize the printer type and the error, and projection generation 120 may include generating content 202 and images 204 and 206 that include instructions for fixing the error.

Although processing device 100 is shown FIGS. 2A-2E as being a single device, in some embodiments processing device 100 may have separate distributed components or may omit one or more elements that are implemented in another device or system. For example, image capture device 116 may be located separate from projection device 118. In some such embodiments, both image capture device 116 and projection device 118 are in communication with processing device 100. For example, image capture device 116 may be an image capture device associated with a video game console, and may be configured to recognize and/or track a user or other object or may transmit information to the processing device 100 to recognize and/or track, for example using recognition 122 and/or tracking 124. Projection device 118 may be configured to project content on and around the user or object to create a (e.g., immersive) game experience for the user. Further, processing device 100 may be capable of detecting gestures made by the user to control aspects of the video game or other features of the projected content. In such embodiments, projection device 118 may be capable of projecting a capture frame 208 or capture area 212 at a second rate such that gestures made by the user may be observed or such that content may be moved or adjusted based on images of the user captured when capture frame or capture area 212 is projected. In some embodiments, the image capture device 116 is implemented in a remote or control device, for example as may be used with a displayed or projected content or with a gaming system. Any of the techniques used to time capture of an image or indicate which frame comprises a capture frame or includes a capture area described above may be implemented when distributed components are utilized. In some embodiments, one or both of the image capture device 116 and projection device 118 are included in a wearable device, for example a head mounted display (HMD), a device worn around the wrist or arm of a user, a device configured to hang about the neck of the user, smart fabric or clothing, and/or other wearable elements. In some embodiments, one or more elements may be implemented in a system or device that is independent of the other elements described with respect to the processing device 100. For example, in some embodiments, the projection device 118 may be omitted and independent from the processing device 100. In an example, the processing device 100 may comprise a mobile device such as a smartphone and may capture and/or process images comprising a capture frame projected by the independent projection device 118. In one example, the projection device 118 may project content associated with an application (e.g., "app") utilized by the mobile device. The application may be configured to identify capture frames or areas, for example based on a known or determined fiducial or marker, and/or may present information to the user regarding an object on which content is projected. Those of skill in the art will appreciate that the distributed and/or independent components described above may be implemented in and/or used with any of the embodiments described herein, for example with one or more of the embodiments described with respect to FIGS. 3-7.

Figure 3A:
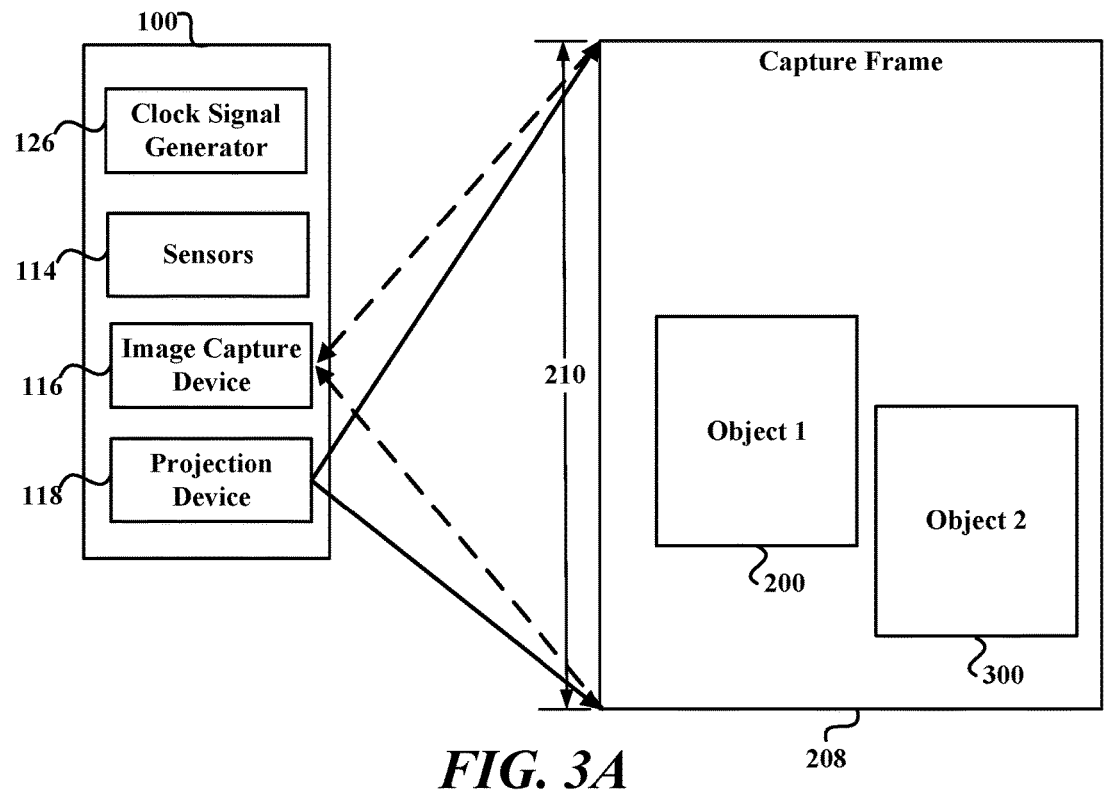
FIGS. 3A and 3B illustrate an example of capturing images for input and projecting content, consistent with some embodiments.
Figure 3B:
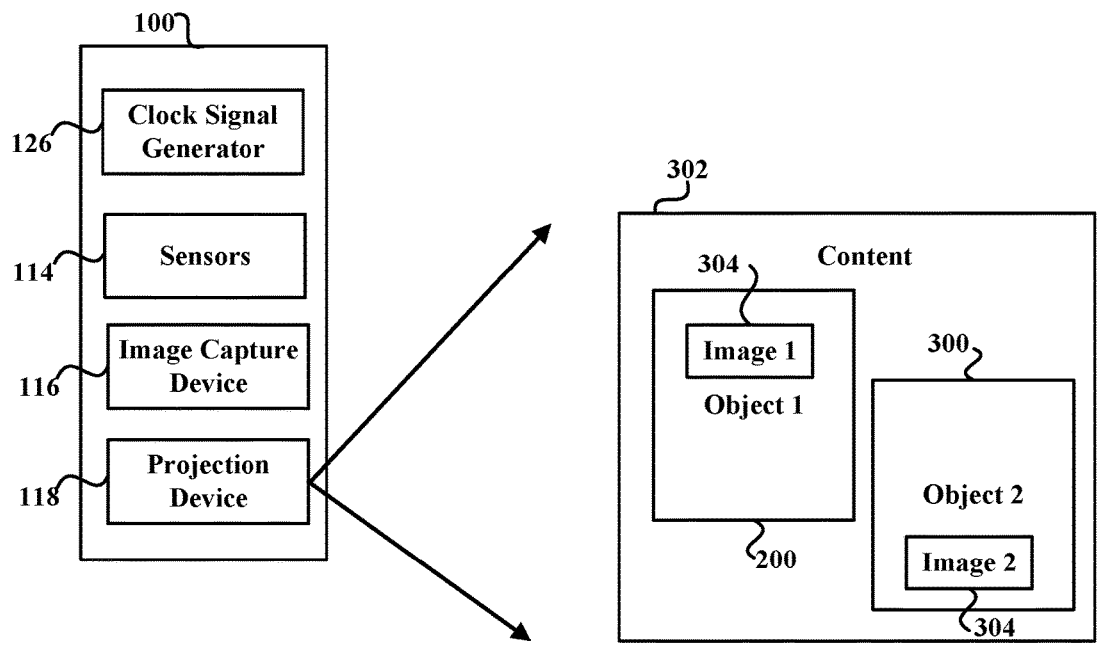

FIGS. 3A and 3B illustrate an example of alternating capturing an image and projecting content, consistent with some embodiments. For the purpose of illustration, only a portion of processing device 100 is shown in FIGS. 3A and 3B, however reference may be made to other components of processing device 100 shown in FIG. 1. Moreover, reference may be made to FIGS. 2A-2E for illustration. As shown in FIG. 3A, a second object, object 2 300 is now in the field of view of image capture device 116 along with object 1 200, which in some embodiments may be the same object 1 200 from FIGS. 2A-2E but, in other embodiments, may be a different object. In some embodiments, the object 1 200 is the same as in FIG. 2B and has been introduced subsequent to the configuration illustrated therein. As capture frame 208 is periodically projected by projection device 118, object 2 300 may be identified, and features associated with object 2 300 may be processed for object recognition 122 and tracking 124. Moreover, because capture frame 208 may be a blank frame where no content is projected or a frame of a solid neutral color that does not obscure lines, features, or boundaries of object 1 200 and object 2 300, processing features and boundaries associated with object 1 200 and object 2 300 for object recognition 122 and tracking 124 may be improved.

As shown in FIG. 3B, based on processing the image captured by image capture device 116 while capture frame 208 was being projected, projection generation 120 may include content 302 that may be related to both object 1 200 and object 2 300. Moreover, content 302 may be projected on and/or around object 1 200 and object 2 300 based on a position of both object 1 200 and object 2 300 as determined by processing the image captured by image capture device 116 as capture frame 208 was projected for tracking 124. For example, content 302 may include image 1 304 for projection onto object 1 200 at a particular location and image 2 306 for projection onto object 2 300 at a particular location. In some embodiments, the content and position of image 1 304 and image 2 306 may be designated by a user of device 100. In some embodiments, the content and position of image 1 304 and image 2 306 may be predetermined based on object 1 200 and object 2 300 based on object recognition 122. For example, the content and position of image 1 304 and image 2 306 may be set by a manufacturer, distributor, or merchant of object 1 200 or object 2 300, a content provider, or an app developer.

In one example, object 1 200 and object 2 300 may be playing or trading cards. Object recognition 122 may recognize object 1 200 as a particular card, tracking may determine a position of the card, and projection generation 120 may include generating content related to that card, such as the name, value, and other information related to that card that may be projected on or around the card. When object 2 300 is added into field of view 210, object recognition 122 may recognize object 2 300 based on an image captured as image capture frame 208 is projected as another card, and tracking 124 may determine a location of the card. Projection generation 120 may then include generating content related to the second card as well as the first card, the content being projected onto and around each card. Separate content may be projected for each card or related content may be projected for both cards. In some embodiments, the content being projected onto and around each card may be unified content that is projected around both cards. The unified content may illustrate a dialog or confrontation between characters printed on the cards. In some embodiments, the processing device 100 may determine if content for one of the cards has priority and may project content appropriately. For example, only the content having priority may be projected, or the content having priority may be projected over other content.

Figure 4A:
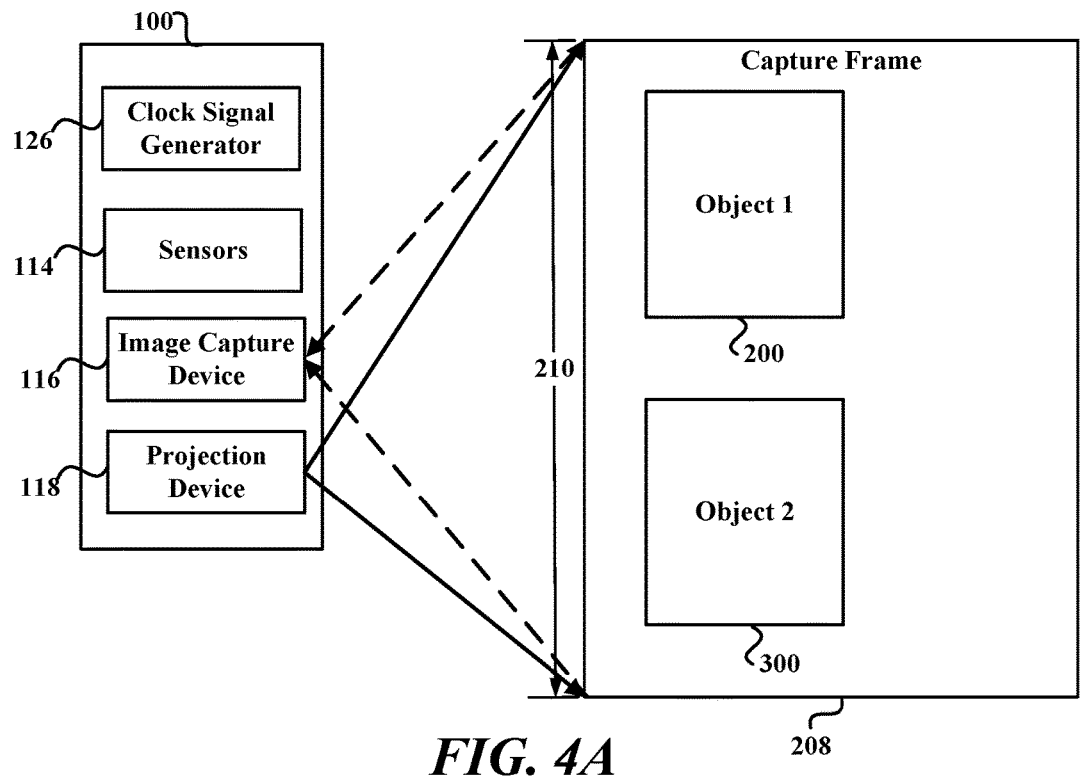
FIGS. 4A and 4B illustrate another example of capturing images for input and projecting content, consistent with some embodiments.
Figure 4B:
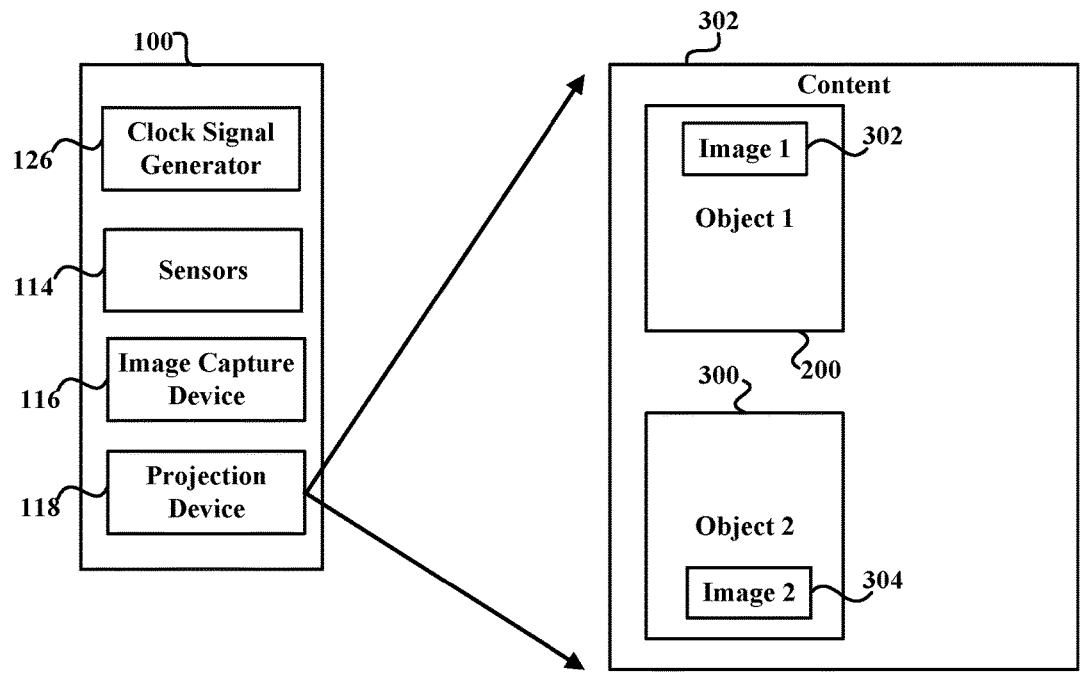

FIGS. 4A and 4B illustrate another example of alternating capturing an image and projecting content, consistent with some embodiments. As shown in FIG. 4A, the position of object 1 200 and object 2 300 may have changed with respect to the position shown in FIG. 3B. In some embodiments, when projection device 118 projects capture frame 208, image capture device 116 may capture an image that may be used for processing. The captured image may be used for performing computer vision functions such as tracking 124 and object recognition 122, for example. Processing object 1 200 and object 2 300 with tracking 124 may reveal the new positioning of object 1 200 and/or object 2 300 with respect to the position of object 1 200 and/or object 2 300 previously shown in FIG. 3B. As shown in FIG. 4B, the positioning information determined by tracking 124 may be used for projection generation 120 such that content 302 including image 1 304 and image 2 306 is projected on and around object 1 200 and object 2 300 based on the new position of object 1 200 and object 2 300. Those of skill in the art will appreciate that while two objects are illustrated in FIGS. 3-4, additional objects may be recognized and/or tracked, or some other computer vision function may be performed with respect to such additional objects. Further, those of skill in the art will appreciate that the processing device 100 may omit recognition 122 and/or tracking 124 while processing one or more capture frames.

Figure 5A:
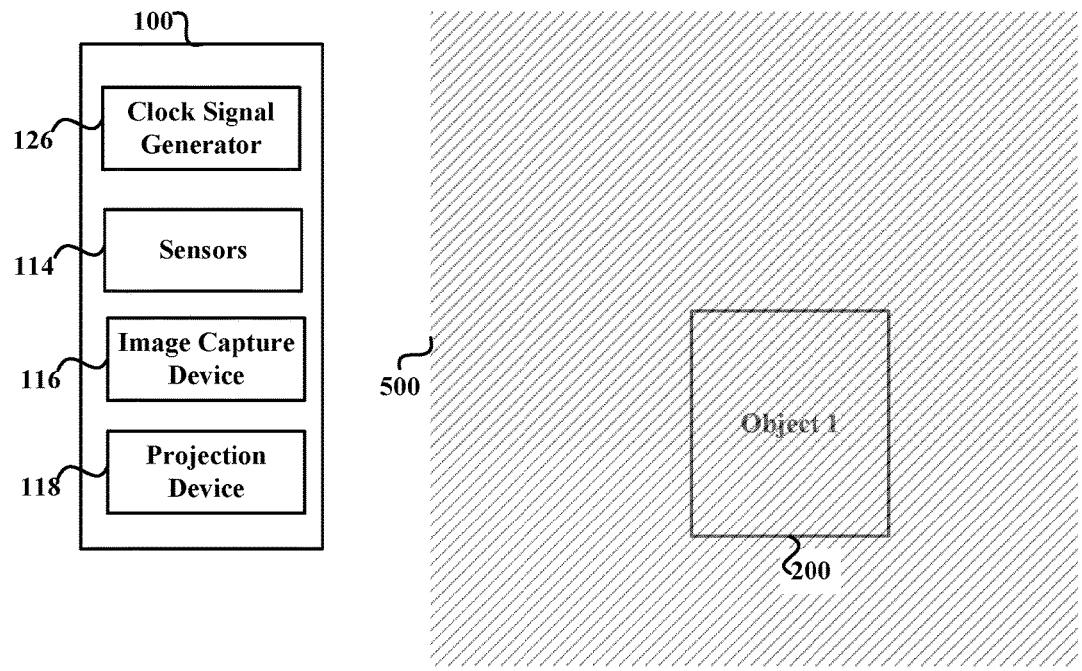
FIGS. 5A and 5B illustrate an example of capturing images for input and projecting content in low-light situations, consistent with some embodiments.
Figure 5B:
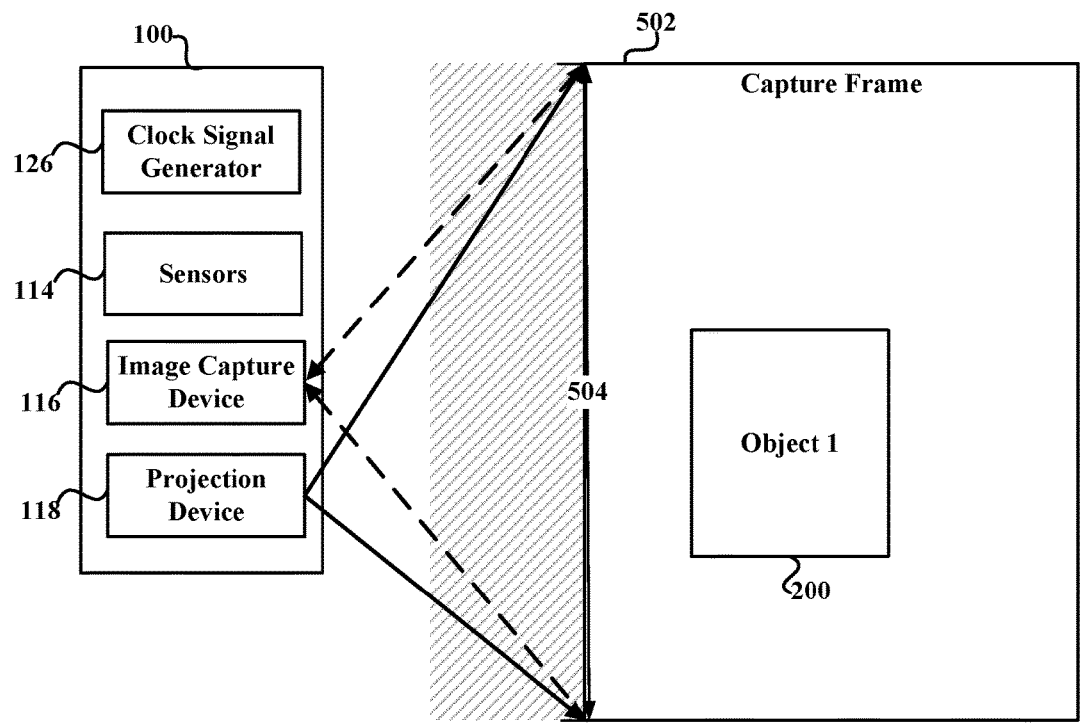

FIGS. 5A and 5B illustrate an example of alternating capturing an image and projecting content in low-light situations, consistent with some embodiments. As shown in FIG. 5A, object 1 200 may be in an area 500 having low light. Because image capture device 116 may use a relatively fast shutter speed and short exposure time, images captured of object 1 200 in area 500 may have low or poor image quality in some implementations. As a result, features, boundaries, and other information about object 1 200 and area 500 may not be easily detected for object recognition 122 or tracking 124. Any projection based on processing an image having poor image quality may also have poor quality or may be incomplete or incorrect for object 1 200.

As shown in FIG. 5B, projection generation 120 may include generating a capture frame 502 having a high-light intensity that may better illuminate the portion of area 500 onto which capture frame 502 is projected. In some embodiments, image capture device 116 may be capable of capturing an image of a field of view 504 including capture frame 502 having the high-light intensity. The captured image may then be processed for object recognition 122 and/or tracking 124, and may provide improved results as features, boundaries, and lines of object 1 200 and field of view 504 are better illuminated. In some embodiments, capture frame 502 may be a frame of a solid color having high light intensity. In some embodiments, capture frame 502 may be a blank frame and processing device 100 may include a flash lamp or light emitting diode (LED) or the like that may be activated or illuminated when capture frame 502 is projected. In some embodiments, projection device 118 may be capable of sending a signal to image capture device 116 over bus 104 when capture frame 502 is being projected. In some embodiments, image capture device 116 and projection device 118 may be synchronized based on a clock signal generated by clock signal generator 126 so that capture frame 502 is projected and an image of field of view 504 is captured at a predetermined timing. In some embodiments, this predetermined timing may be sufficient to enable tracking 124 and/or object recognition 122 while capture frame 502 remains relatively unnoticed by a human eye.

Figure 6:
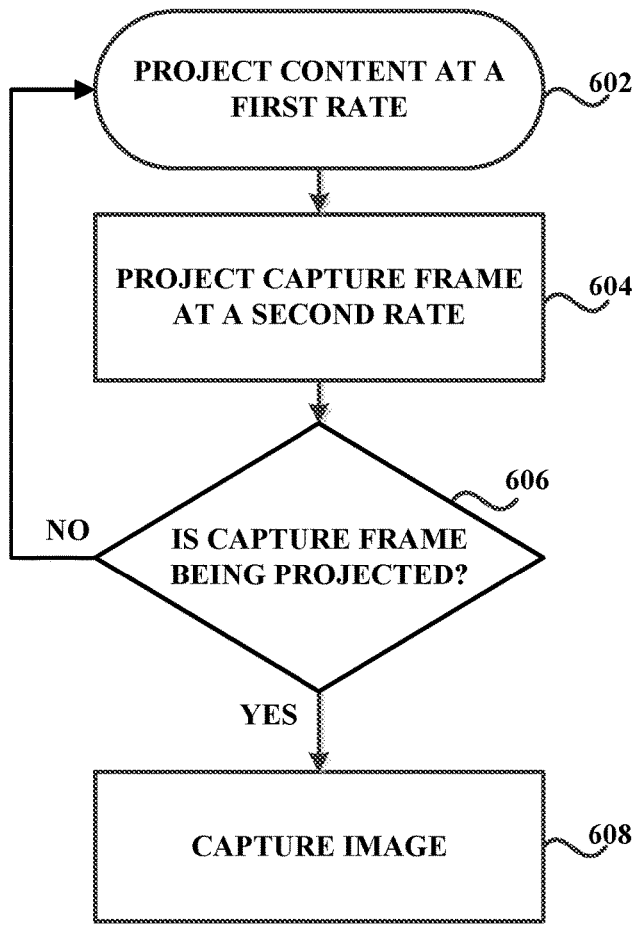
FIG. 6 is a flowchart illustrating a process for capturing images for input and projecting content, consistent with some embodiments.

FIG. 6 is a flowchart illustrating a process for projecting content and capturing an image, consistent with some embodiments. For the purpose of illustration, FIG. 6 will be described with reference to any of FIGS. 1, 2A-2E, 3A-3B, 4A-4B, and 5A-5B. The process 600 shown in FIG. 6 may be embodied in computer-readable instructions in memory component 108, projection generation 120, object recognition 122, and/or tracking 124 for execution by one or more processors therein or in processing component 106 of device 100. In some embodiments, process 600 or portions thereof may be implemented by an operating system of device 100 and/or may be implemented as a background service in the operating system or subsystem of a component of device 100. As shown in FIG. 6, process 600 begins by projecting content at a first rate (602). In some embodiments, projection generation 120 based on object recognition 122, tracking 124, and user input may generate content for projection. The content may be generated for projection onto one or more objects and/or targets. In some embodiments, the content may be projected to augment the one or more objects and/or targets to create an augmented reality around the one or more objects and/or targets. The content may be one or more images, image frames, a series of image frames, or a combination thereof. The first rate may be a projection rate between frame rate of about 23.976-300 frames per second (fps). In some embodiments, the first rate may be about 72 fps.

Process 600 continues by projecting a capture frame at a second rate (604). In some embodiments, the capture frame may be a blank frame where no content is projected, or a frame of a solid neutral color that is projected on the field of view to allow image capture device to capture an image that does not obscure lines, features, or boundaries of objects within the field of view of image capture device 116 that may be processed for object recognition 122 or for tracking 124. Moreover, the capture frame may include or be composed of a frame of high light intensity that may be used to illuminate the field of view to facilitate image capture by image capture device 116 in low-light situations. The capture frame may also be a frame that includes a fiducial or marker that provides an indication that the image captured that includes the fiducial or marker is to be processed for performing computer vision functions. In some embodiments, the second rate that capture frame is projected at may be a frame rate that is lower than the first frame rate. In some embodiments, the second rate may be about 10-20 fps. For example, the second rate may be about 15 fps. In general, the second rate is a rate that is sufficient for image capture device 116 to capture an image without the capture frame being visible to the human eye of a user of device 100 or an observer.

Process 600 may continue by determining if a capture frame is being projected (606). Determination of whether a capture frame is being projected may be made by receiving a signal from projection device 118 that a capture frame is being projected. Alternatively, the projection of a capture frame by projection device 118 may be synchronized according to a clock signal generated by clock signal generator such that a capture frame is projected every x ms. Moreover, the projection of a capture frame by projection device 118 may be synchronized based on the number of content frames projected by projection device 118. For example, projection device 118 may be capable of projecting a capture frame every y number of content frames. Furthermore, process 600 may determine if a capture frame is being projected based on the presence or absence of a fiducial or marker in a captured image.

If a capture frame is not being projected, projection device 118 is projecting content at the first rate (602) and may continue projecting content until a capture frame is to be projected. When a capture frame is projected, image capture device 116 may capture an image of an area including the field of view of image capture device 116 (608). Although process 600 describes not capturing an image of an area including the field of view of image capture device 116 when a capture frame is not projected, image capture device 116 may capture images at other times. For example, image capture device 116 may be configured to capture images at the second rate that is lower than the first rate, but at a rate than is different from the rate at which a capture frame is projected. Based on a fiducial or marker on the capture frame, a timestamp of the capture frame, and the like, device 100 may be able to determine which of the captured images to process for computer vision functions. Image capture device 116 may be configured to capture images at the first rate or a higher rate and determine which of the captured images to process for computer vision functions.

Figure 7:
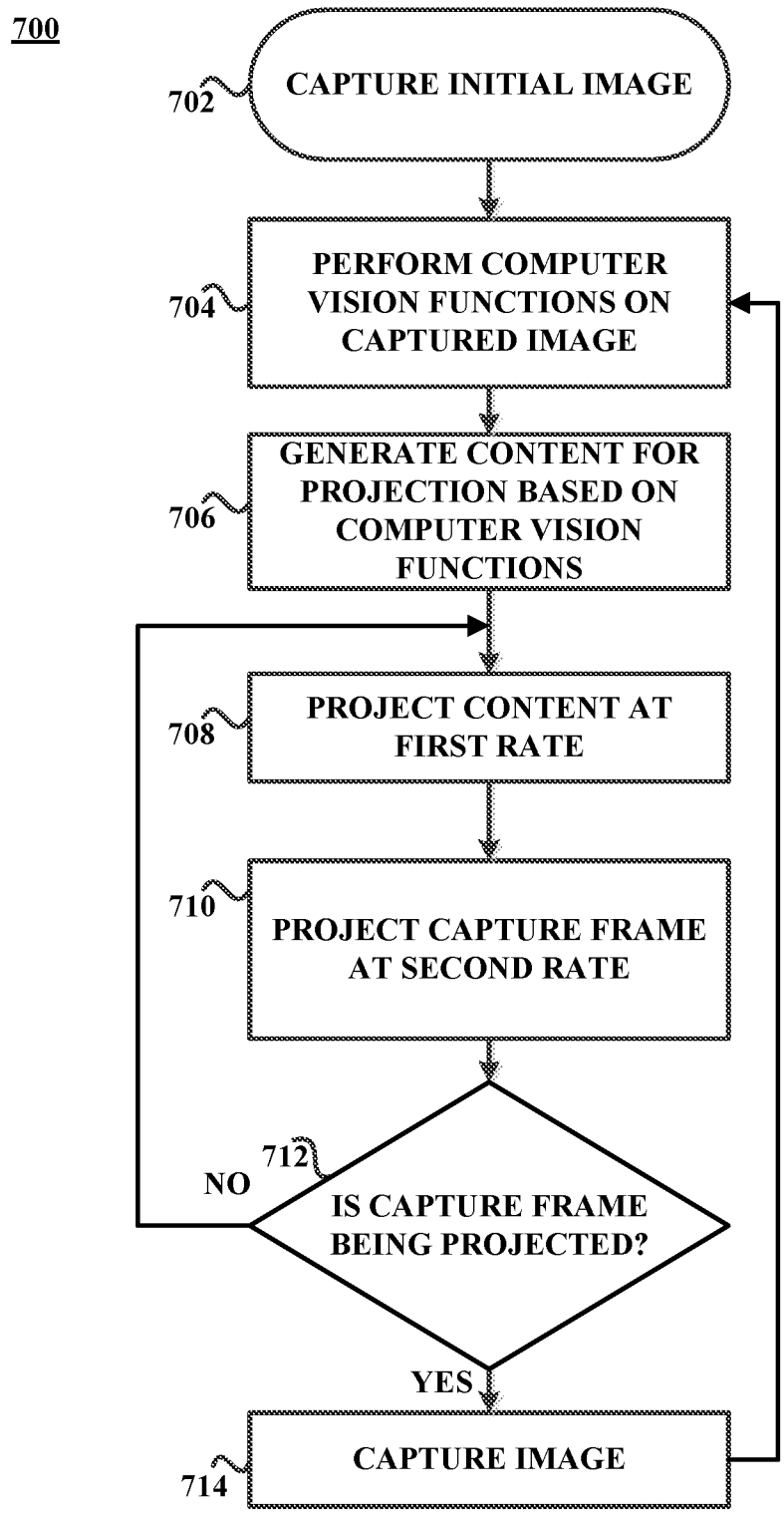
FIG. 7 is a flowchart illustrating a process for projecting content and capturing an image, consistent with some embodiments.

FIG. 7 is a flowchart illustrating a process for alternating projecting content and capturing an image, consistent with some embodiments. For the purpose of illustration, FIG. 7 will be described with reference to any of FIGS. 1, 2A-2E, 3A-3B, 4A-4B, and 5A-5B. The process 700 shown in FIG. 7 may be embodied in computer-readable instructions in memory component 108, projection generation 120, object recognition 122, and/or tracking 124 for execution by one or more processors therein or in processing component 106 of device 100. In some embodiments, process 700 or portions thereof may be implemented by an operating system of device 100 and/or may be implemented as a background service in the operating system or subsystem of a component of device 100. For example, the image capture and/or computer vision portions of process 700 may be implemented in a camera subsystem, graphics processor, or video front end (VFE) of device 100. As shown in FIG. 7, process 700 begins by capturing an initial image (702). In some embodiments, the initial image may be captured by image capture device 116. Computer vision functions may then be performed on the captured image (704) to generate content for projection (706). For example, on an initial image object recognition 122 may be performed and on subsequent captured images tracking 124 may be performed. Tracking 124 may include determining a location and orientation of objects in a target area over a period of time for directing content for projection in the target area and onto one or more objects in the target area. In some embodiments, tracking 124 may include estimating pose, orientation, and depth information about the target area and objects in the target area, such as object 1 200 and/or object 2 300. Object recognition 122 may include performing one or more object recognition algorithms on the initial image and/or subsequent captured images captured by image capture device 116 for tracking 124 the subsequent captured images and projection generation 120. In some embodiments, object recognition 122 may include determining or finding content associated with objects identified in the captured initial image.

Content may then be projected at a first rate (708). The content may be generated for projection onto one or more objects and/or targets. In some embodiments, the content may be projected to augment the one or more objects and/or targets to create an augmented reality around the one or more objects and/or targets. The content may be one or more images, image frames, a series of image frames, or a combination thereof. The first rate may be a projection rate between frame rate of about 23.976-300 frames per second (fps). In some embodiments, the first rate may be about 72 fps. A capture frame may then be projected at a second rate (710). In some embodiments, the capture frame may be a blank frame where no content is projected, or a frame of a solid neutral color that is projected on the field of view to allow image capture device to capture an image that does not obscure lines, features, or boundaries of objects within the field of view of image capture device 116 that may be processed for object recognition 122 and/or for tracking 124. Moreover, the capture frame may include or be composed of a frame of high light intensity that may be used to illuminate the field of view to facilitate image capture by image capture device 116 in low-light situations. In some embodiments, the capture frame may include a fiducial or marker that may server as an indication that the image captured that includes the fiducial or marker is to be processed for computer vision functions. In some embodiments, the second rate that capture frame is projected at may be a frame rate that is lower than the first frame rate. In some embodiments, the second rate may be about 10-20 fps. For example, the second rate may be about 15 fps. In general, the second rate is a rate that is sufficient for image capture device 116 to capture an image without the capture frame being visible to the human eye of a user of device 100 or an observer.

Process 700 may continue by determining if a capture frame is being projected (712). Determination of whether a capture frame is being projected may be made by receiving a signal from projection device 118 that a capture frame is being projected. Alternatively, the projection of a capture frame by projection device 118 may be synchronized according to a clock signal generated by clock signal generator such that a capture frame is projected every x ms. Moreover, the projection of a capture frame by projection device 118 may be synchronized based on the number of content frames projected by projection device 118. For example, projection device 118 may be capable of projecting a capture frame every y number of content frames.

If a capture frame is not being projected, projection device 118 may be projecting content at the first rate (708) and may continue projecting content until a capture frame is to be projected. When a capture frame is projected, image capture device 116 may capture an image of an area including the field of view of image capture device 116 (714). Object recognition 122 and/or tracking 124 and/or other computer vision functions may then be performed on the captured image (704) to generate content for projection (706). In some embodiments, generating the content for projection may include generating the content for projection based on object recognition 122 and/or tracking 124. For example, if an object has moved from its position in the initial captured image, tracking 124 may identify the new position of the object and projection generation 120 may include projecting the content at the new position. Moreover, if an additional object has been included in a field of view that was not recognized in the initial image, object recognition 122 may recognize the new object and a position or orientation of the new object may be determined such that the projection generation 120 may include generating content based on the new object that may be projected onto and around the new object. Process 700 may be capable of creating an augmented reality on and around an object or a plurality of objects detected by object recognition 122. Moreover, process 700 may be used in video games or other applications.

Although process 700 describes not capturing an image of an area including the field of view of image capture device 116 when a capture frame is not projected, image capture device 116 may capture images at other times. For example, image capture device 116 may be configured to capture images at the second rate that is lower than the first rate, but at a rate than is different from the rate at which a capture frame is projected. Based on a fiducial or marker on the capture frame, a timestamp of the capture frame, and the like, device 100 may be able to determine which of the captured images to process for computer vision functions. Image capture device 116 may be configured to capture images at the first rate or a higher rate and determine which of the captured images to process for computer vision functions.

Software, in accordance with the present disclosure, such as program code and/or data, may be stored on one or more machine readable mediums, including non-transitory machine readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide a system and method for alternating the projection of content and the capturing of an image during a period when no image is being projected. The embodiments and examples provided herein may provide an improvement by allowing image capture when no content is being projected so that the projection may be corrected or changed based on an image of an area that is not occluded by the projection. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A method, comprising:
    projecting, by a projection device, a capture frame at a first frame rate;
    capturing, by an image capture device, an image of an object when the capture frame is projected;
    performing a computer vision function based at least in part on the captured image; and
    projecting, by the projection device, content frames at a second frame rate,
    wherein the content frames include information regarding the object; and
    wherein the first frame rate is lower than the second frame rate.

2. The method of claim 1, wherein projecting the capture frame comprises projecting one of a frame of a solid color and a frame having no image.

3. The method of claim 1, wherein projecting the capture frame at the first frame rate comprises projecting the capture frame at the first frame rate such that the projected capture frame is not noticeable by an observer.

4. The method of claim 1, wherein performing the computer vision function comprises:
    performing object recognition based on the captured image; or
    performing tracking based on the captured image.

5. The method of claim 4, further comprising:
    generating the content frames for projection based on the performed object recognition or tracking.

6. The method of claim 4, wherein projecting the content frames comprises projecting a content frame that occludes the object on which the object recognition or tracking is performed.

7. The method of claim 4, wherein performing the tracking on the captured image comprises determining at least one of a position, orientation, or depth of the object in the captured image.

8. The method of claim 1, wherein capturing the image of the object comprises:
    receiving, by the image capture device, a signal indicating that the capture frame is being projected; and
    capturing the image in response to receiving the signal.

9. The method of claim 1, wherein images are captured at a frame rate that is at least two times the first frame rate and the method comprises synchronizing the projection device and the image capture device to capture at least one image including the capture frame and capture at least one image not including the capture frame.

10. A system, comprising:
    a projection device configured to project a capture frame at a first frame rate and content frames at a second frame rate, wherein the first frame rate is lower than the second frame rate;
    an image capture device configured to capture an image of an object when the projection device projects the capture frame;
    one or more processors coupled to the projection device and the image capture device, the one or more processors configured to process the captured image and generate the content frames or determine a location or orientation of the content frames for projection based at least in part on the captured image, wherein the content frames include information regarding the object; and
    a memory coupled to the one or more processors.

11. The system of claim 10, wherein the projected capture frame comprises one of a solid-colored capture frame, and a capture frame having no image.

12. The system of claim 10, wherein the image capture device comprises a camera.

13. The system of claim 12, wherein the camera comprises at least one of a visible light camera, a depth-sensing camera, a camera capable of detecting infrared (IR) light or ultraviolet (UV) light, a stereo camera, or a time-of-flight (ToF) camera.

14. The system of claim 10, wherein the projection device comprises at least one of a Digital Light Processing (DLP) projector, a laser beam-steering (LBS) projector, or a liquid crystal on silicon (LCoS) projector.

15. The system of claim 10, wherein the one or more processors are configured to control a content and a position of the projected content frames based on the object in the captured image.

16. The system of claim 10, wherein the one or more processors are configured to perform object recognition on the captured image.

17. The system of claim 10, wherein the one or more processors are configured to perform tracking based on the captured image.

18. The system of claim 10, wherein the projected content frames create an augmented reality on or around the object in the captured image.

19. A system, comprising:
 means for projecting a capture frame at a first frame rate;
 means for capturing an image of an object when the capture frame is projected;
 means for performing a computer vision function based at least in part on the captured image; and
 means for projecting content frames at a second frame rate,
 wherein the content frames include information regarding the object; and
 wherein the first frame rate is lower than the second frame rate.

20. The system of claim 19, wherein the means for projecting the capture frame is configured to project at least one of a frame of a solid color or a frame having no image.

21. The system of claim 19, wherein the means for projecting the capture frame is configured to project the capture frame at the first frame rate such that the projected capture frame is not noticeable by an observer.

22. The system of claim 19, wherein the means for performing the computer vision function comprises at least one of:
 means for performing object recognition based on the captured image; or
 means for performing tracking based on the captured image.

23. The system of claim 22, further comprising:
 means for generating the content frames for projection based on the performed object recognition or tracking.

24. The system of claim 23, wherein a generated content frame for projection, when projected, occludes the object on which the object recognition or tracking is performed.

25. The system of claim 22, wherein the means for performing tracking is configured to determine at least one of a position, orientation, or depth of the object in the captured image.

26. The system of claim 19, wherein the means for capturing the image comprises:
 means for receiving a signal indicating that the capture frame is being projected.

27. The system of claim 19, wherein the means for capturing the image and the means for projecting are synchronized to capture images at a third frame rate that is at least two times the first frame rate such that at least one image including the capture frame is captured and at least one image not including the capture frame is captured by the means for capturing during operation of the system.

28. A non-transitory computer-readable medium including instructions that, when executed by one or more processors, cause the one or more processors to perform a method comprising:
 projecting a capture frame at a first frame rate;
 capturing an image of an object when the capture frame is projected;
 performing a computer vision function based at least in part on the captured image; and
 projecting content frames at a second frame rate,
 wherein the content frames include information regarding the object; and
 wherein the first frame rate is lower than the second frame rate.

29. The method of claim 1, wherein the first frame rate is no greater than a half of the second frame rate.

30. The method of claim 1, wherein the capture frame is projected when no content frames are projected.

* * * * *